(12) United States Patent
Pugina

(10) Patent No.: US 9,859,839 B2
(45) Date of Patent: Jan. 2, 2018

(54) COMBINED SOLAR AND WIND POWER GENERATION

(71) Applicant: Marcio Pugina, Orem, UT (US)

(72) Inventor: Marcio Pugina, Orem, UT (US)

(*) Notice: Subject to any disclaimer, the term of this patent is extended or adjusted under 35 U.S.C. 154(b) by 616 days.

(21) Appl. No.: 14/473,755

(22) Filed: Aug. 29, 2014

(65) Prior Publication Data
US 2016/0065115 A1    Mar. 3, 2016

(51) Int. Cl.
| | |
|---|---|
| *H02S 10/12* | (2014.01) |
| *F03D 3/00* | (2006.01) |
| *H02S 30/10* | (2014.01) |
| *F03D 13/20* | (2016.01) |
| *F03D 9/00* | (2016.01) |
| *F03D 3/06* | (2006.01) |
| *F03D 9/25* | (2016.01) |
| *H02K 7/18* | (2006.01) |
| *H02J 3/38* | (2006.01) |

(52) U.S. Cl.
CPC ............. *H02S 10/12* (2014.12); *F03D 3/005* (2013.01); *F03D 3/062* (2013.01); *F03D 9/007* (2013.01); *F03D 9/25* (2016.05); *F03D 13/22* (2016.05); *H02S 30/10* (2014.12); *F05B 2240/9112* (2013.01); *H02J 3/386* (2013.01); *H02K 7/183* (2013.01); *Y02B 10/30* (2013.01); *Y02E 10/50* (2013.01); *Y02E 10/721* (2013.01); *Y02E 10/723* (2013.01); *Y02E 10/725* (2013.01); *Y02E 10/728* (2013.01); *Y02E 10/74* (2013.01); *Y02E 10/763* (2013.01)

(58) Field of Classification Search
None
See application file for complete search history.

(56) References Cited

U.S. PATENT DOCUMENTS

| | | | |
|---|---|---|---|
| 4,421,943 A | 12/1983 | Withjack | |
| 5,075,564 A * | 12/1991 | Hickey | B63H 9/06 290/44 |
| 5,103,646 A * | 4/1992 | Fini | F01D 11/003 60/641.8 |
| 5,133,637 A | 7/1992 | Wadsworth | |
| 5,254,876 A * | 10/1993 | Hickey | F03D 1/0608 290/44 |
| 5,969,501 A | 10/1999 | Glidden et al. | |
| 6,308,521 B1 | 10/2001 | Eylman | |
| 6,688,842 B2 | 2/2004 | Boatner | |
| 7,851,935 B2 | 12/2010 | Tsao | |
| 8,432,053 B2 * | 4/2013 | Frayne | F03D 7/026 290/44 |
| 9,605,659 B2 * | 3/2017 | Haar | F03D 13/40 |
| 2007/0176431 A1 * | 8/2007 | Graham, Sr. | F03D 3/002 290/55 |
| 2010/0133820 A1 * | 6/2010 | Tsao | F03D 3/00 290/44 |

(Continued)

*Primary Examiner* — Tuan T Lam
(74) *Attorney, Agent, or Firm* — Kunzler, PC

(57) ABSTRACT

An apparatus, system, and method are disclosed for power generation. A wind turbine is configured to drive an electrical generator. One or more solar panels are electrically coupled to the electrical generator to provide power from the electrical generator and/or the one or more solar panels. A base is configured for mounting the wind turbine to a structure. The wind turbine may be pivotally coupled to the base such that an angle of the wind turbine is adjustable relative to the structure.

19 Claims, 7 Drawing Sheets

(56) References Cited

U.S. PATENT DOCUMENTS

| | | | | |
|---|---|---|---|---|
| 2010/0170293 A1* | 7/2010 | Tsarev | .................... | F03D 9/007 62/476 |
| 2010/0252706 A1* | 10/2010 | Hargis | .................... | F24J 2/523 248/237 |
| 2011/0089698 A1* | 4/2011 | Ahmadi | .................. | F03D 9/007 290/55 |
| 2011/0221203 A1* | 9/2011 | Miller | .................... | F03D 9/007 290/55 |

* cited by examiner

500 ↘

| Electrical Production in One Month | | | | | | | |
|---|---|---|---|---|---|---|---|
| WIND | | | | | | | |
| Wind Speed for One Hour per Day (mph) 502 | 5 | 10 | 15 | 20 | 23 | 27 | 30 |
| KWH Production 504 | 146 | 324 | 616 | 2290 | 4583 | 6853 | 9063 |
| SOLAR | | | | | | | |
| Hours of Sun 506 | 5 | 8 | 8 | 8 | 8 | 8 | 8 |
| KWH Production 508 | 135 | 216 | 216 | 216 | 216 | 216 | 216 |
| Total KWH per Month 510 | 281 | 540 | 832 | 2506 | 4799 | 7069 | 9279 |

FIG. 5

COMBINED SOLAR AND WIND POWER GENERATION

FIELD

The present disclosure, in various embodiments, relates to electrical power generation and more particularly relates to combining solar and wind energy sources to generate electrical power.

BACKGROUND

Most electrical power generation in the United States relies on non-renewable fossil fuels such as coal, oil, and natural gas, which are harmful to the environment and increasingly costly. Generating power from renewable sources, such as solar and wind energy, avoids the increasing cost and environmental harm associated with fossil fuels.

Residential power customers can reduce power bills significantly by generating some of their own electricity from renewable sources. However, installing a large array of solar panels or a windmill may involve a large upfront investment, which may be paid off by reduced power bills only over several years (if at all, depending on the cost and the lifespan of the solar panels or windmill). Also, solar energy and wind energy are highly variable, and may provide little power on overcast or calm days. Moreover, some cities and homeowner associations don't allow homeowners to install large arrays of solar panels, or a large windmill.

SUMMARY

Apparatuses are disclosed for power generation. In one embodiment, a wind turbine is configured to drive an electrical generator. In a certain embodiment, one or more solar panels are electrically coupled to the electrical generator to provide power from the electrical generator and/or the one or more solar panels. In a further embodiment, a base is configured for mounting the wind turbine to a structure. In some embodiments, the wind turbine may be pivotally coupled to the base such that an angle of the wind turbine is adjustable relative to the structure.

In one embodiment the adjustable angle of the wind turbine relative to the structure enables the wind turbine to be folded down adjacent to the structure. In another embodiment, the one or more solar panels may be mechanically coupled to the base, for stabilizing the wind turbine. In a further embodiment, the structure may be a rooftop and the base may span multiple rooftop support beams.

In one embodiment, the one or more solar panels may be electrically coupled to the electrical generator in series. In a certain embodiment, a power inverter may be configured to convert electrical power from the electrical generator and/or the one or more solar panels to grid-compatible electrical power. In another embodiment, one or more batteries may be configured to store energy produced by the electrical generator and/or the one or more solar panels.

In one embodiment, the wind turbine may include a vertical axis wind turbine. In a further embodiment, the vertical axis wind turbine may include a Savonius wind turbine. In some embodiments, the Savonius wind turbine may include three blades and a top plate. In further embodiments, the blades may be removably connected to the top plate and to a mast for the wind turbine.

In one embodiment, a thermoelectric generator may be electrically coupled to the electrical generator and to the one or more solar panels. In a further embodiment, the thermoelectric generator may be configured to generate electrical power from a temperature difference between parts of the wind turbine, the electrical generator, the one or more solar panels, the base, and/or the structure. In one embodiment, a height of the wind turbine may be less than six feet above the structure.

Systems are disclosed for power generation. In one embodiment, a wind turbine is configured to drive an electrical generator. In a certain embodiment, one or more solar panels are mounted to a rooftop. In a further embodiment, the one or more solar panels are electrically coupled to the electrical generator. In some embodiments, a base is configured to couple the wind turbine to the rooftop. In certain embodiments, the wind turbine may be pivotally coupled to the base such that an angle of the wind turbine is adjustable relative to the rooftop. In further embodiments, the base may be mechanically coupled to the one or more solar panels for stabilizing the wind turbine. In one embodiment, a power inverter is configured to convert electrical power from the electrical generator and/or the one or more solar panels to grid-compatible electrical power.

In one embodiment, one or more batteries may be configured to store energy produced by the electrical generator and the one or more solar panels. In a certain embodiment, a system may include the rooftop. In a further embodiment, the base may span multiple rooftop support beams. In one embodiment, the one or more solar panels may be electrically coupled to the electrical generator in series.

Methods of power generation are disclosed. In one embodiment, a method includes providing a wind turbine configured to drive an electrical generator. In a certain embodiment, a method includes electrically coupling one or more solar panels to the electrical generator to provide power from the electrical generator and/or the one or more solar panels. In a further embodiment, a method includes mounting a base for the wind turbine to a structure. In some embodiments, the wind turbine may be pivotally coupled to the base such that an angle of the wind turbine is adjustable relative to the structure.

In one embodiment, the structure may include a sloped rooftop, and a method may include adjusting the angle of the wind turbine relative to the structure such that an axis of the wind turbine is vertical. In another embodiment, a method may include adjusting the angle of the wind turbine relative to the structure such that the wind turbine is folded down adjacent to the structure, in response to a prediction of dangerous weather conditions.

BRIEF DESCRIPTION OF THE DRAWINGS

In order that the advantages of the disclosure will be readily understood, a more particular description of the disclosure briefly described above will be rendered by reference to specific embodiments that are illustrated in the appended drawings. Understanding that these drawings depict only typical embodiments of the disclosure and are not therefore to be considered to be limiting of its scope, the disclosure will be described and explained with additional specificity and detail through the use of the accompanying drawings, in which:

FIG. 5 is a table illustrating the electrical production of one embodiment of an apparatus for power generation;

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the invention may be combined in any suitable manner in one or more embodiments. In the following description, numerous specific details are disclosed, to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 1:
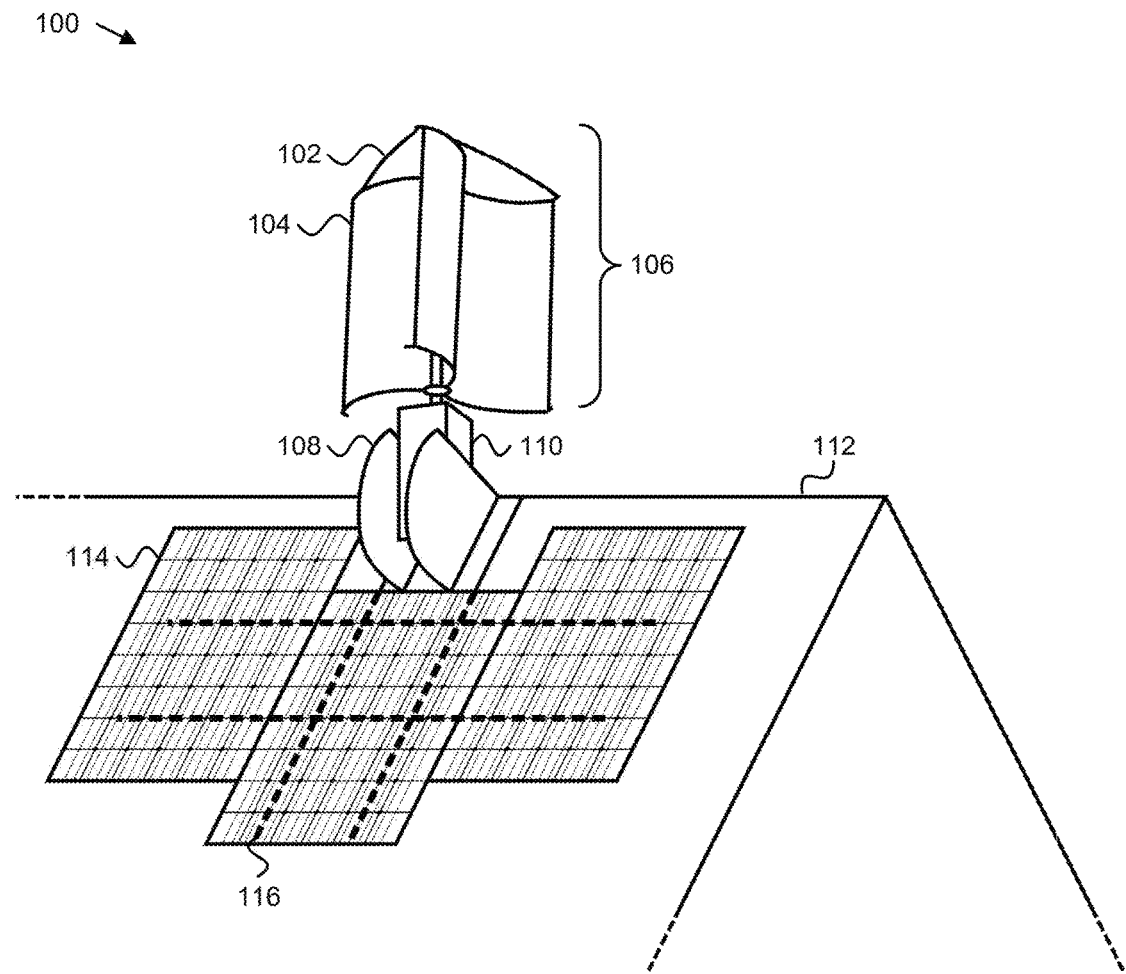
FIG. 1 is a perspective view illustrating one embodiment of a system for power generation.

FIG. 1 depicts one embodiment of a system 100 for power generation. In the depicted embodiment, the system includes a wind turbine 106; one or more solar panels 114, and a base 108. In the depicted embodiment, the wind turbine 106 includes a top plate 102 and blades 104. In a certain embodiment, the wind turbine 106 is configured to drive an electrical generator 110. In the depicted embodiment, the base 108 is configured for mounting the wind turbine 106 to a structure 112.

In various embodiments, a system 100 for power generation that includes a wind turbine 106 configured to drive a generator 110, one or more solar panels 114, and a base 108 configured for mounting the wind turbine 106 to a structure 112 may generate electrical power using a combination of wind and solar energy. In certain embodiments, generating electrical power using a combination of wind and solar energy may provide more consistent and inexpensive power than relying on either wind energy or solar energy alone.

For clarity in depicting the wind turbine 106, solar panels 114, and base 108 as parts of a system 100, FIG. 1 omits certain elements that may be included in various embodiments of systems and apparatuses for power generation, such as electrical cables, a power inverter and/or one or more batteries, as described in greater detail below with regard to FIG. 2. Similarly, FIG. 1 omits particulars of the base 108, generator 110, and wind turbine 106 that are described in greater detail below with regard to FIGS. 3 and 4.

In various embodiments, a wind turbine 106 may refer to any device configured to convert wind energy into rotational energy, such as a windmill, or the like. In the depicted embodiment, the wind turbine 106 is a vertical axis wind turbine ("VAWT"). In another embodiment, the wind turbine 106 may be a horizontal axis wind turbine ("HAWT"). In certain embodiments, HAWTs may use a wind vane, wind sensor, yaw motor, or the like to position the turbine 106 into the wind. Also, in a further embodiment, a HAWT may be mounted on a tower so that the ground, or another structure 112, does not interfere with the rotational motion of the wind turbine 106. Therefore, in some embodiments a wind turbine 106 configured as a VAWT may extract wind energy without the added complexity associated with mounting a HAWT on a tower or pointing it into the wind.

Additionally, in certain embodiments, a VAWT mounted on a rooftop or other structure 112 may be no more prominent than other rooftop-mounted machinery such as air conditioners, swamp coolers, attic fans, and the like, and may be allowed by cities and/or homeowner associations which would not allow a more visually obtrusive HAWT in residential areas. Thus, in one embodiment, a wind turbine 106 may be compact, to comply with local ordinances and other restrictions, and/or for convenient rooftop mounting in residential areas. For example, in one embodiment, a height of a wind turbine 106 above the base 108 may be less than approximately six feet. (As used herein, an approximate measurement refers to the stated measurement, plus or minus ten percent). In another compact embodiment, the height of the wind turbine 106 may be approximately four feet above the base 108, and the wind turbine 106 may have a width of approximately three feet across the circle swept out by the blades 104. In view of this disclosure, several possible compact dimensions for a wind turbine 106 are clear.

In the depicted embodiment, the wind turbine 106 is a Savonius wind turbine, and includes three blades 104 and a top plate 102. In the Savonius wind turbine 106, the blades 104 are scoop-shaped, and may be referred to interchangeably as blades 104 or scoops. In the depicted embodiment, the top plate 102 facilitates capturing wind in the scoops 104, particularly if the structure 112 is a gabled rooftop or other sloped structure that diverts wind upward. In one embodiment, an additional bottom plate below the scoops 104 may facilitate wind capturing wind in the scoops 104 when wind is directed downward. In another embodiment, however, a bottom plate may counterproductively block upward-directed winds from reaching the scoops 104, and therefore may be omitted. In various embodiments, a top plate 102 and/or a bottom plate may be attached to the blades 104, or may be stationary, with a bearing for the mast at the center of the blades 104, so that the tops or bottoms of the blades 104 move along the stationary top plate 102 or bottom plate.

In certain embodiments, a Savonius wind turbine 106 with at least three blades 104 may be self-starting. However, in another embodiment, a wind turbine 106 may include fewer than three blades 104, or more than three blades 104. Also, in various embodiments, the wind turbine may 106 may include helical blades 104 for smoother operation. In various embodiments, the wind turbine 106 may include blades 104 of various shapes, such as airfoil-shaped blades 104 for a Darrieus wind turbine or Giromill, flat blades configured with a particular angle of attack for a HAWT, or the like. In the depicted embodiment, the Savonius wind turbine 106 with three straight blades 104 and a top plate 102 provides lower cost and higher reliability than other types of wind turbines 106, suitable for residential installation. However, in another embodiment, a system 100 for power generation may include another type of wind turbine 106 if efficiency is valued over reliability, or if cost is less of a concern. In view of this disclosure, many types of wind turbine 106, including many shapes and different numbers of blades 104 are clear that are suitable for use in a system 100 for power generation. The wind turbine 106 is described in further detail below with regard to FIGS. 3 and 4

In certain embodiments, the wind turbine 106 is configured to drive an electrical generator 110. In general, in various embodiments, a generator 110 may refer to any device configured to convert mechanical energy to electrical energy. In certain embodiments, the generator 110 converts rotational energy from the wind turbine 106 to electrical energy. The wind turbine 106 may drive the generator 110 directly via a common shaft, or indirectly via a gearbox, belt drive, or the like. In view of this disclosure, many ways to configure a wind turbine 106 and a generator 110 so that the wind turbine 106 drives the generator 110 are clear.

In various embodiments, the generator 110 may be any of various types of generators 110, such as a direct current ("DC") generator 110, or dynamo, an alternating current ("AC") generator 110, or alternator, a homopolar DC generator, or the like. In one embodiment, the generator 110 may be a DC generator 110, for compatibility with solar panels 114 that produce a DC voltage. In another embodiment, however, the generator 110 may be an AC generator 110 with its output rectified for compatibility with DC solar panels 114. In view of this disclosure, many types of generator 110 are clear which are suitable for use in a system 100 for power generation.

In the depicted embodiment, one or more solar panels 114 are electrically coupled to the generator 110. In some embodiments, a solar panel 114 may refer to any type of panel configured to convert solar energy to electricity. For example, in various embodiments, solar panels 114 may include flat or curved solar panels 114, panels that include single solar cells or arrays or arrays of solar cells, photovoltaic panels, dye-sensitized solar cells, luminescent solar concentrators, biohybrid solar cells, or the like.

In certain embodiments, the one or more solar panels 114 may be electrically coupled to the electrical generator 110, so that the system 100 provides power from the solar panels 114 and/or the generator 110. In one embodiment, the solar panels 114 may be electrically coupled to the generator 110 in series, to increase the available voltage from both. For example, in one embodiment, a power inverter that converts power from the solar panels 114 and/or the generator 110 to grid-compatible power may have a minimum voltage for operation, so connecting the solar panels 114 and the generator 110 in series may provide sufficient voltage to operate the power inverter even on a still day when the generator 110 voltage is low, or on a cloudy day when the solar panel 114 voltage is low. Similarly, increasing the available voltage may be useful for charging batteries, whether or not a power inverter is used. In another embodiment, the solar panels 114 may be electrically coupled to the generator 110 in parallel, to increase the available current from both. In view of this disclosure, many different ways of electrically coupling one or more solar panels 114 to a generator 110 are clear.

In certain embodiments, a user or owner may select a number of solar panels 114 to balance the power produced by the generator 110. For example, if the number of solar panels 114 is large, a system 100 with a single generator 110 may experience difficulties associated with a predominantly solar energy solution, such as lower than expected power generation on cloudy days. However, if the number of solar panels 114 is small, or if the generator 110 produces a large amount of power (e.g., in high wind areas), the system 100 may experience difficulties associated with a predominantly wind energy solution, such as lower than expected power generation on still days. Therefore, in one embodiment, a user or owner may select a number of solar panels 114 so that the total energy produced by the solar panels 114 and the generator 110 is approximately equal on a partly cloudy day with low winds, for example. In another embodiment, a user may select a different balance of solar and wind power suitable for a different weather condition.

In one embodiment, the solar panels 114 may be mechanically coupled or connected to the base 108. In certain embodiments, a mechanical connection between the base 108 and the solar panels 114 may stabilize the base 108 and the wind turbine 106. For example, in one embodiment, connection arms 116 (shown with dotted lines in FIG. 1) may extend from the base 108 beneath the solar panels 114, and the solar panels may be mounted to the connection arms 116 and to the structure 112 (or to the structure 112 via the connection arms 116), thus stabilizing the wind turbine 106. In a further embodiment, the connection arms 116 may also provide a conduit for routing electrical wires between the solar panels 114 and the generator 110. In another embodiment, the base 108 may provide a larger flat surface for mounting solar panels 114, and the weight of the solar panels 114 on the base 108 may stabilize the wind turbine 106. In view of this disclosure many types of stabilizing mechanical connections between the base 108 and the solar panels 114 are clear.

In certain embodiments, the solar panels 114 may be mounted directly to the base 108, the structure 112, an adjoining structure, or the like. In another embodiment, one or more solar panels 114 may be integrated with the wind turbine 108. For example, in one embodiment, curved solar panels may be integrated with the blades 104. In another embodiment, solar panels may be mounted to the upper surface of the top plate 102, mounted to a housing for the wind turbine 108 or the like. In some embodiments, mounting solar panels 114 to the wind turbine 108 may provide a compact system 100 for power generation.

In one embodiment, the base 108 is configured for mounting the wind turbine 106 to a structure 112. In certain embodiments, the base 108 may mount the wind turbine 106 to the structure either directly or indirectly. For example, in the depicted embodiment, the base 108 is mounted to the structure 112, the generator 110 is mounted to the base 108, and the wind turbine 106 is mounted to the generator 110.

In one embodiment, the structure 112 may include a flat surface, and the base 108 may include a flat lower surface for mounting the wind turbine 106 to the structure 112. For example, in a certain embodiment, the structure 112 may be a rooftop, and the base 108 may span multiple rooftop support beams, such as rafters, trusses, joists, girders, or the like. In certain embodiments, the base 108 may include a flat lower surface that spans multiple rooftop support beams. In further embodiments, the base 108 may include members extending from the base 108 that span multiple rooftop support beams.

In another embodiment, the structure 112 may include a narrow member such as a rod or I-beam, and the base 108 may include one or more clamps for mounting the wind turbine 106 to the structure. In yet another embodiment, the structure 112 may include a chimney, and the base may include a band that extends around the chimney. In view of this disclosure, many types of bases 108 for mounting wind turbines 106 to structures 112 are clear.

In a certain embodiment, the wind turbine 106 may be pivotally coupled to the base 108 so that a user or owner of the system 100 may adjust an angle of the wind turbine 106 relative to the structure 112. As used herein, an angle of the wind turbine 106 relative to the structure 112 refers to the angle of an axis that is typically vertical during operation, such as the axis of a VAWT, a tower or mast for a HAWT, or the like. However, the angle of the wind turbine 106 relative to the structure 112 does not refer to the yaw angle of a HAWT. In one embodiment, a user or owner of the system 100 may adjust the angle of the wind turbine 106 relative to the structure 112 to compensate for a sloped structure 112, such as a pitched rooftop, so that the axis of the wind turbine 106 is vertical. In another embodiment, a user or owner of the system 100 may adjust the angle of the wind turbine 106 relative to the structure 112 in response to dangerous or stormy weather conditions, to fold the wind turbine 106 down adjacent to the structure 112. In certain embodiments, folding the wind turbine 106 down adjacent to the structure 112 may prevent damage to the wind turbine 106 and/or the structure 112 in high winds, storms, hurricane conditions, or the like.

In various embodiments, the wind turbine 106 may be may be pivotally coupled to the base 108 in various ways. For example, in one embodiment, a hinge may connect the wind turbine 106 or generator 110 to the base 108. In another embodiment, curved tracks in the base 108 may allow the wind turbine 106 or generator 110 to pivot with respect to the base 108. In view of this disclosure, many ways of pivotally coupling a wind turbine 106 to a base 108 are clear. One embodiment of a wind turbine 106 pivotally coupled to a base 110 is described further below with regard to FIG. 3.

In one embodiment, the system 100 may include the structure 112. In another embodiment, an apparatus for power generation may include elements of the system 100 for mounting on a structure 112. In the depicted embodiment, the structure 112 is a pitched rooftop. In various embodiments, the structure 112 may be any structure 112 suitable for mounting a wind turbine 106 and one or more solar panels 114. In certain embodiments, the structure 112 may provide sufficient height for positioning the wind turbine 106 in at least mild winds, and for positioning the solar panels 114 in the sun. For example, in one embodiment, the structure 112 may be a rooftop of a building which receives more wind and sun on its roof than on the ground adjacent to the building. In certain embodiment, the structure 112 may be the pitched or flat rooftop of a residential building, commercial building, garden shed, or the like. In another embodiment, the structure 112 may be a tower for radio antennas, a signpost (with a small system 100 providing power for an electric sign or traffic light), a utility pole, or the like. In a further embodiment, the base 108 may mount the wind turbine 106 onto one structure 112, and the solar panels 114 may be mounted onto another structure, such as an adjoining building. In view of this disclosure, many types of structure 112 that are suitable for supporting a wind turbine 106 mounted to the structure 112 via a base 108 are clear.

In a certain embodiment, the system 100 may include a thermoelectric generator (not shown). In some embodiments, a thermoelectric generator may generate electrical power from a temperature difference, such a temperature difference between parts of the wind turbine 106, the generator 110, the solar panels 114, the base 108, and/or the structure 112. For example, in various embodiments, a thermoelectric generator may generate electrical power from temperature differences between the base 108 and the blades 104, between the sun-heated solar panels 114 and the wind-cooled turbine 106, between light-colored elements and dark-colored elements, and the like. In various embodiments, the thermoelectric generator may include a thermocouple, a series of thermocouples configured as a thermopile, a bi-metallic junction device, a doped semiconductor device, or other thermoelectric materials. Many possible thermoelectric materials for use in a thermoelectric generator are clear in view of this disclosure.

In a further embodiment, the thermoelectric generator may be electrically coupled to the electrical generator 110 and to the one or more solar panels 114. As discussed above with regard to the connection between the generator 110 and the solar panels 114, the thermoelectric generator may be connected in series for additional voltage, or connected in parallel for additional current.

Figure 2:
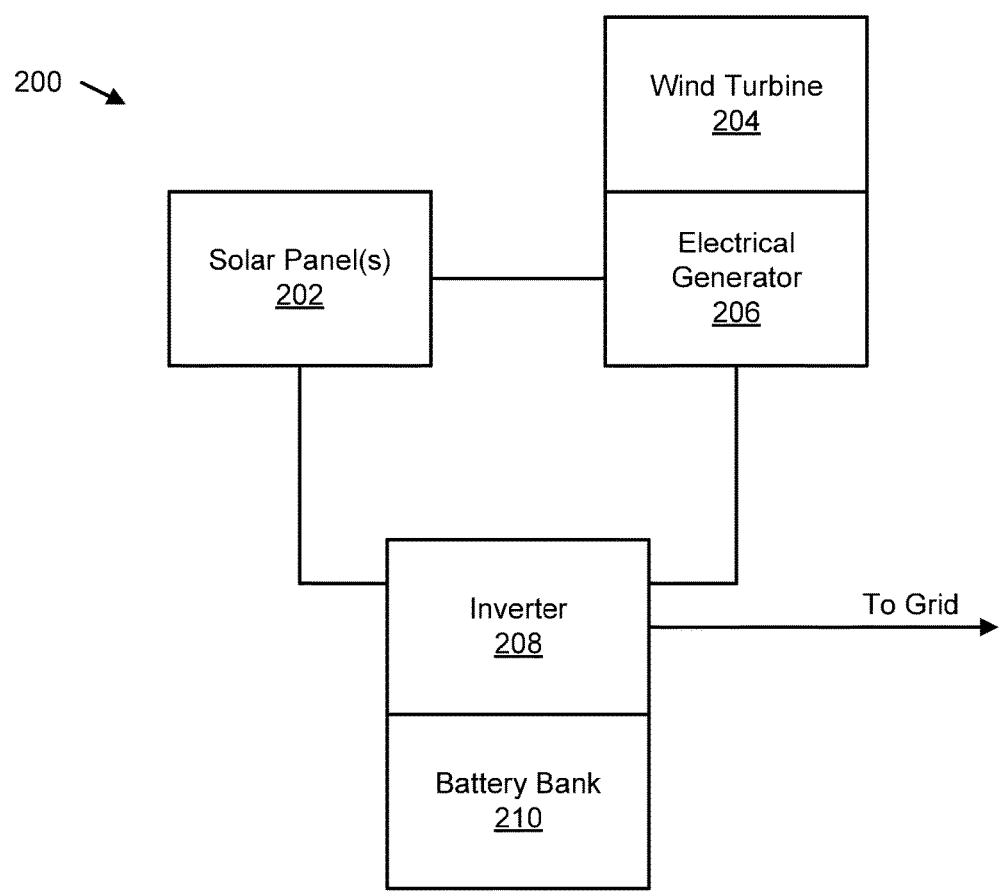
FIG. 2 is a schematic block diagram illustrating one embodiment of an apparatus for power generation.

While the system 100 and the apparatus 200 described below with regard to FIG. 2 are primarily described with regard to a rooftop structure 112, in certain embodiments, the structure 112 may comprise the ground, a tree, or another natural, non-manmade surface. For example, the wind turbine 106, the one or more solar panels 114, and/or the base 108, in one embodiment, may be portable, and may be temporarily or permanently installable on the ground, on a tree, on a tent, on a mobile home, on a trailer, or the like. In a further embodiment, the wind turbine 106, the one or more solar panels 114, and/or the base 108 may be removably installable on a rooftop structure 112 while a user is home (e.g., may provide power to an outlet in a garage or another location) and may be removed and temporarily installed on the ground, in a tree, on a trailer, or the like while the user is traveling away from home, or the like (e.g., connected to a bank of batteries, or the like). As described below, the one or more solar panels 114 may be flexible, foldable, collapsible, or the like, to facilitate portable transportation.

FIG. 2 depicts one embodiment of an apparatus 200 for power generation. The apparatus 200, in certain embodiments, may be substantially similar to the system 100 described above with regard to FIG. 1. In the depicted embodiment, the apparatus 200 includes one or more solar panels 202, a wind turbine 204, and an electrical generator 206, which may be substantially as described above with regard to the solar panels 114, wind turbine 106, and electrical generator 110 of FIG. 1. In the depicted embodiment, the apparatus 200 includes a power inverter 208 and a battery bank 210. In various embodiments, am apparatus 100 for power generation may include either a power inverter 208 or a battery bank 210 or both.

In one embodiment the inverter 208 may be configured to convert electrical power from the one or more solar panels 202 and/or the generator 206 to grid-compatible electrical power. In various embodiments, an inverter may receive DC electrical power from the solar panels 202 and/or the generator 206, and may produce grid-compatible electrical power that matches the voltage, frequency, and phase of electrical power received from a local utility grid. In the depicted embodiment, the inverter 208 may be connected to the local utility grid, and the user or owner of the apparatus 200 may receive a credit on his or her utility bill for power provided to the grid, be billed on a net electrical meter reading, or the like. In another embodiment, the inverter 208 may not be connected to the local utility grid, but may provide grid-compatible electrical power to power outlets separate from the grid. Grid-compatible power may, in certain embodiments, be convenient for powering devices designed for use on the grid even if power from the apparatus 200 is not connected to the grid. In another embodiment, the inverter 208 may convert power from the solar panels 202 and/or the generator 206 to non-grid-compatible AC. For example, the output of some inverters 208 may differ in phase from grid power, or include harmonics unsuitable for some devices. However, non-grid-compatible AC may be sufficient for some devices, and may be provided by a lower-cost inverter 208.

In the depicted embodiment, the solar panels 202 and the generator 206 are connected to the inverter 208 in series. Connecting the two power sources in series adds the voltage from both sources, thus increasing the likelihood that the available voltage will exceed a minimum input voltage for the inverter 208. In another embodiment, however, the solar panels 202 and the generator 206 may be connected to the inverter 208 in parallel.

In one embodiment, the battery bank 210 includes one or more batteries configured to store energy produced by the one or more solar panels 202 and/or the generator 206. In certain embodiments, the battery bank 210 may include "deep cycle" batteries configured for regular deep discharges. Regularly charging the battery bank 210 when the solar panels 202 and/or the generator 206 provide excess power, and discharging the battery bank 210 when power needs exceed the supply may provide consistently available power on cloudy or still days, or at night.

In one embodiment, a charger for the battery bank 210 may run directly on electrical power from the solar panels 202 and/or generator 206. In another embodiment, a charger for the battery bank 210 may run on power from the inverter 208. In certain embodiments, the battery bank 210 may directly power various DC devices. In further embodiments, the battery bank 210 may provide supplemental power to the inverter 208 when the power produced by the solar panels 202 and/or the generator 206 is low, to power AC devices connected to the inverter 208.

Figure 3:
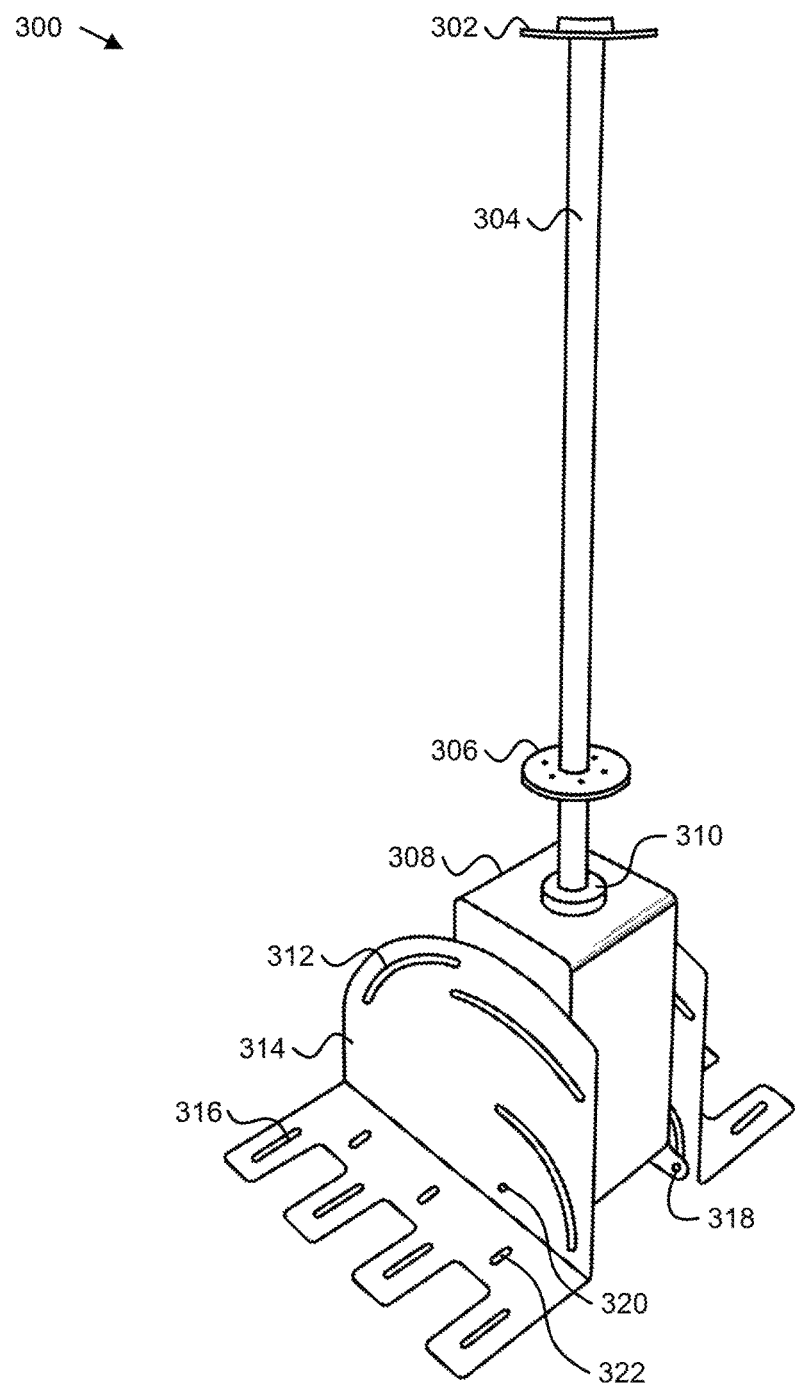
FIG. 3 is a perspective view illustrating portions of another embodiment of an apparatus for power generation.

FIG. 3 depicts details of another embodiment of an apparatus 300 for power generation. The apparatus 300, in certain embodiments, may be substantially similar to the system 100 or apparatus 200 described above with regard to FIGS. 1 and 2. In the depicted embodiment, the apparatus 300 includes a base 314, a generator 308, and a mast 304 for a wind turbine, which may be configured substantially as described above with regard to the base 108, generator 110, 206, and wind turbine 106 of FIGS. 1 and 2. The mast 304, in the depicted embodiment, includes blade mounting flanges 302, 306. The generator 308, in the depicted embodiment, includes a bearing 310 and an extension member 318 for coupling the generator 308 to the base 314 The base 314, in the depicted embodiment, includes curved tracks 312, a pivot point 320, and mounting holes 316, 322.

Figure 4:
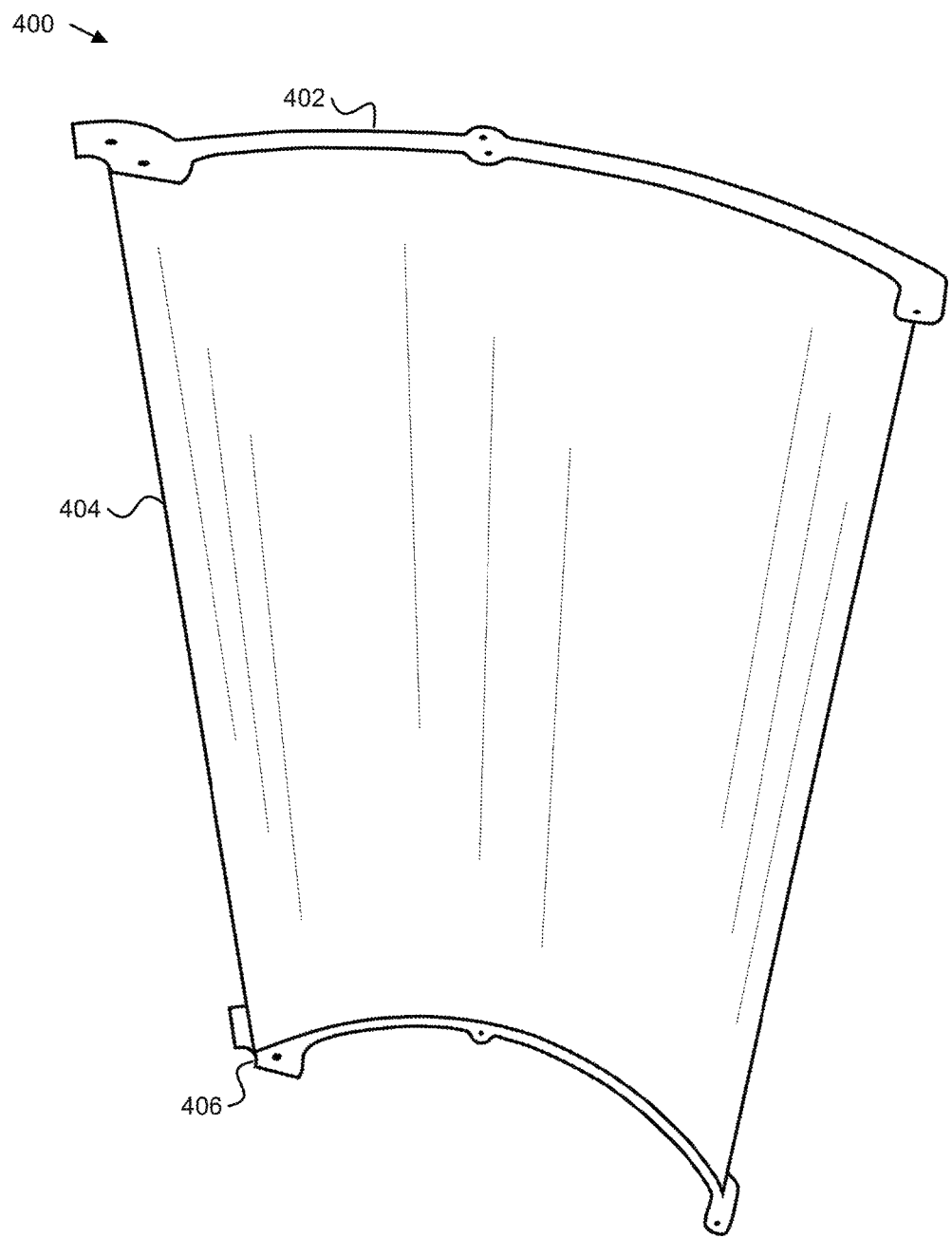
FIG. 4 is a perspective view illustrating a wind turbine blade for one embodiment of an apparatus for power generation.

In one embodiment, the mast 304 is a central shaft to which wind turbine blades (as depicted in FIG. 4) are attached. In a further embodiment, the mast 304 rotates as wind propels the blades. In certain embodiments, the blades may be removably connected to the top plate and/or the mast 304. Removable blades may, in some embodiments, make a wind turbine easier to install on a rooftop or other structure, by allowing an installer to make multiple trips to carry lighter or smaller individual parts.

In the depicted embodiment, the mast 304 includes a top flange 302 and a bottom flange 306 for mounting turbine blades. In a further embodiment, screws, bolts, or other fasteners may affix the blades to the mast 304 through holes in top and bottom brackets for the blades that match holes in the top and bottom flanges 302, 306. In one embodiment, a top plate for the wind turbine may be bolted to the top flange 302, the top brackets of the blades, or both. Although the depicted embodiment includes flanges 302, 306 for mounting blades, the blades may be connected to the mast in another way, in another embodiment. For example, in one embodiment, blades may engage corresponding slots in the mast 304. In view of this disclosure, many ways of connecting wind turbine blades to a mast 304 are clear.

In one embodiment, the generator 308 includes a bearing 310. In the depicted embodiment, the mast 304 acts as the driveshaft for the generator 308, and the bearing 310 keeps the mast 304 aligned along the axis of rotation for driving the generator, while allowing the mast 304 to rotate freely.

In a further embodiment, the generator 308 includes an extension member 318 for coupling the generator 308 to the base 314. In the depicted embodiment, the extension member 318 is a thin, flat extension from the body of the generator 308, with a mounting hole that matches a curved track 312 in the base 314. In a further embodiment, a bolt extending through the mounting hole and the curved track 312 may be tightened to secure the generator 308 and the wind turbine in place, or loosened to pivot the generator 308 and the wind turbine with respect to the base 314

In one embodiment, the base 314 includes two parts on opposite sides of the generator 308, and each of the two parts includes a flat lower surface with mounting holes 316, 322. Screws inserted through the mounting holes 316, 322 may attach the base 314 to a structure, such as a rooftop. In a further embodiment, each of the two parts of the base 314 includes a flat side extending up from the flat lower surface, along and adjacent to the generator 308. In a further embodiment, the flat sides include curved tracks 312 and a pivot point 320. In one embodiment, the generator 308 and/or the wind turbine is pivotally coupled to the base 314 at the pivot point 320. For example, in the depicted embodiment, a pin, bolt, or other member extends from the body of the generator 308 into the pivot point 320 in the base 314, allowing the generator 308 and the mast 304 to pivot with respect to the base 314, so that an installer can adjust the angle of the mast 304 to vertical when installing the apparatus 300 on a pitched rooftop, or so that a user can fold the mast 304 down adjacent to the structure to prepare for dangerous weather conditions. Bolts inserted through the curved tracks 312 may hold the generator 308 in place, or may be loosened to allow the generator 308 to pivot.

FIG. 4 depicts a wind turbine blade 400. In the depicted embodiment, the blade includes a scoop-shaped surface 404 extending between a top bracket 402 and a bottom bracket 406. As described above with regard to the mast 304 of FIG. 3, the top and bottom brackets 402, 406 for the blade 400 may be attached to top and bottom mounting flanges for a wind turbine mast.

In the depicted embodiment, the top and bottom brackets 402, 406 include holes for mounting the brackets 402, 406 to flanges of a wind turbine mast, and additional holes for mounting top and/or bottom plates to the wind turbine. Additionally, the width of the top and bottom brackets 402, 406 may, in some embodiments, provide rigidity that maintains the shape of the scoop-shaped surface 404 for capturing the wind.

FIG. 5 is a table 500 illustrating the electrical production, in one month of one embodiment of an apparatus or system for power generation. The table 500 refers to one embodiment of a compact apparatus or system for power generation, suitable for residential installation, as depicted in FIG. 1. It may be seen that kilowatt-hour ("KWH") production from wind power 504 increases substantially with the wind speed (during at least one hour of the day) 502. Similar, kilowatt-hour production from solar power 508 increases with the number of hours of available sunlight 508. By inspecting the total electrical production 510, it may be seen that a compact apparatus for power generation may produce between approximately 300 and 600 KWH per month with wind speeds between 5-10 miles per hour, and 5-10 hours of sunshine per day. Thus, the apparatus may provide from 30 to 70% of the electricity needs of an average American home using 830 KWH per month.

Figure 6:
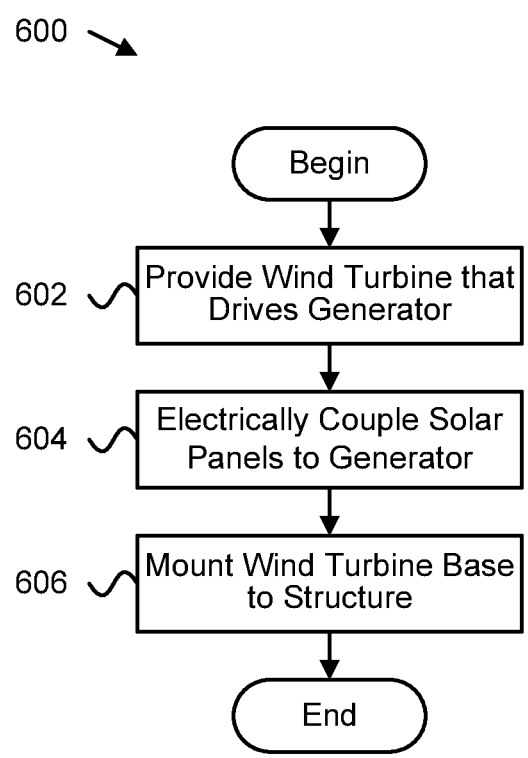
FIG. 6 is a schematic flow chart diagram illustrating one embodiment of a method of power generation.

FIG. 6 depicts one embodiment of a method of power generation. The method 600 begins, and a user or installer provides 602 a wind turbine that drives a generator. The user or installer electrically couples 604 solar panels to the generator to provide power from the solar panels and/or the generator. The user or installer mounts 606 a base for the wind turbine to a structure such that an angle of the wind turbine is adjustable relative to the structure, and the method 600 ends.

Figure 7:
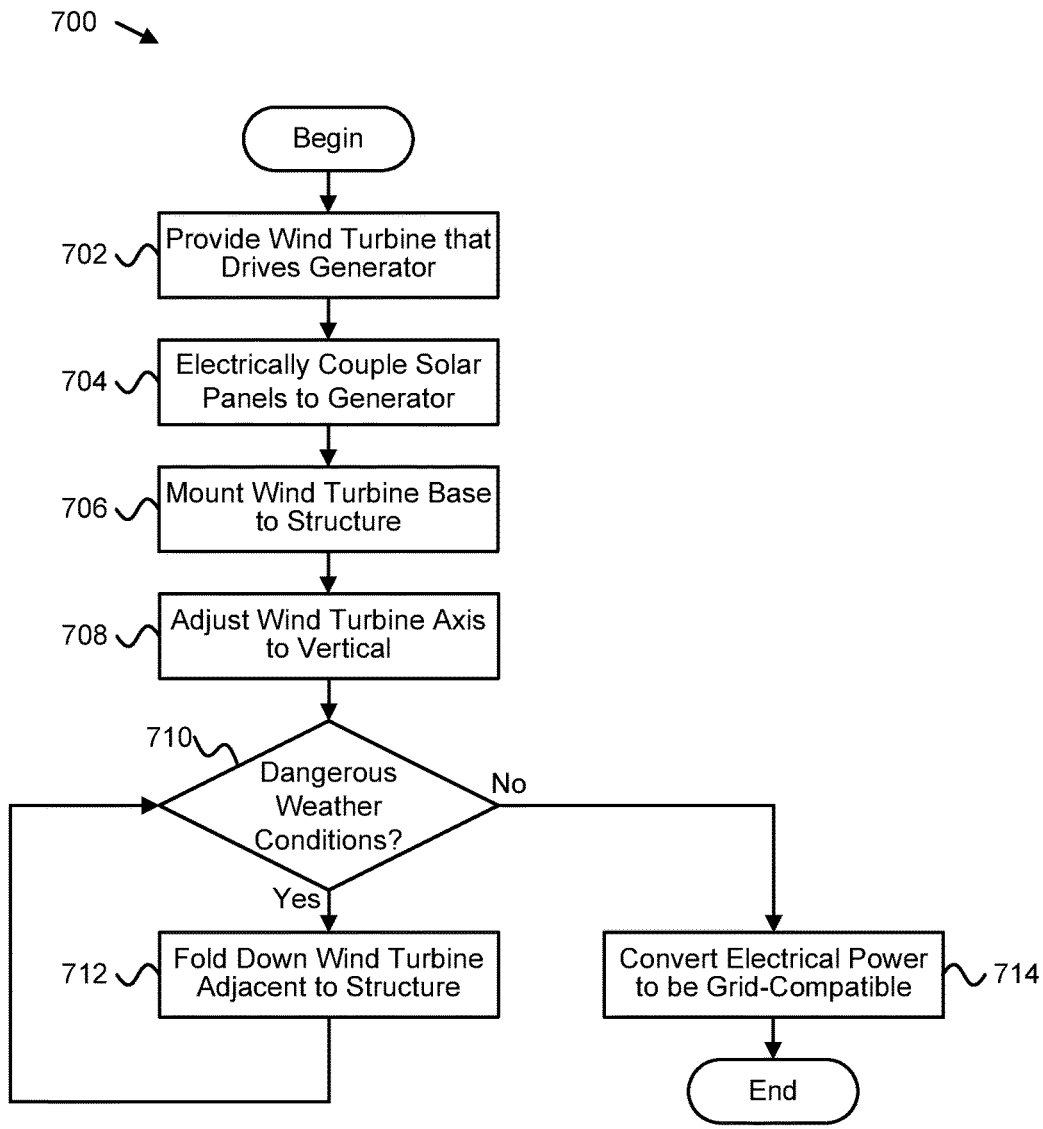
FIG. 7 is a schematic flow chart diagram illustrating another embodiment of a method of power generation.

FIG. 7 depicts another embodiment of a method of power generation. The method 700 begins, and a user or installer provides 702 a wind turbine that drives a generator. The user or installer electrically couples 704 solar panels to the generator to provide power from the solar panels and/or the generator. The user or installer mounts 706 a base for the wind turbine to a structure such that an angle of the wind turbine is adjustable relative to the structure. The user or installer adjusts 708 the angle of the wind turbine so that its axis is vertical. A user determines 710 whether dangerous weather conditions are predicted. If dangerous weather conditions are predicted, the user folds 712 the wind turbine down adjacent to a structure. The wind turbine remains folded down while dangerous weather conditions prevail. If dangerous weather conditions are not predicted (or no longer prevail), the wind turbine axis remains in (or is restored to) the vertical position, a power inverter converts 714 electrical power from the solar panels and/or the generator to be grid-compatible, and the method 700 ends.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for power generation, the apparatus comprising
    a wind turbine configured to drive an electrical generator;
    one or more solar panels electrically coupled to the electrical generator to provide power from one or more of the electrical generator and the one or more solar panels;
    a base for the wind turbine, the wind turbine pivotally coupled to the base such that an angle of the wind turbine is adjustable; and
    one or more connection arms extending laterally from the base, the one or more solar panels mechanically connected to the one or more connection arms such that the one or more solar panels stabilize the wind turbine.

2. The apparatus of claim 1, wherein the adjustable angle of the wind turbine enables the wind turbine to be folded down.

3. The apparatus of claim 1, wherein the base is configured for mounting the wind turbine to a rooftop and the base spans multiple rooftop support beams.

4. The apparatus of claim 1, wherein the one or more solar panels are electrically coupled to the electrical generator in series.

5. The apparatus of claim 1, further comprising a power inverter configured to convert electrical power from one or more of the electrical generator and the one or more solar panels to grid-compatible electrical power.

6. The apparatus of claim 1, further comprising one or more batteries configured to store energy produced by one or more of the electrical generator and the one or more solar panels.

7. The apparatus of claim 1, wherein the wind turbine comprises a vertical axis wind turbine.

8. The apparatus of claim 7, wherein the vertical axis wind turbine comprises a Savonius wind turbine, the Savonius wind turbine comprising three blades and a top plate.

9. The apparatus of claim 8 wherein the blades are removably connected to the top plate and to a mast for the wind turbine.

10. The apparatus of claim 1, further comprising a thermoelectric generator electrically coupled to the electrical generator and to the one or more solar panels, the thermoelectric generator configured to generate electrical power from a temperature difference between parts of one or more of the wind turbine, the electrical generator, the one or more solar panels, the base, and a structure to which the base is mounted.

11. The apparatus of claim 1, wherein a height of the wind turbine is less than six feet.

12. A system for power generation, the system comprising:
    a wind turbine configured to drive an electrical generator;
    one or more solar panels mounted to a rooftop, the one or more solar panels electrically coupled to the electrical generator; and
    a base configured to couple the wind turbine to the rooftop, the wind turbine pivotally coupled to the base such that an angle of the wind turbine is adjustable relative to the rooftop;
    one or more connection arms extending laterally from the base, the one or more solar panels mechanically connected to the one or more connection arms such that the one or more solar panels stabilize the wind turbine; and a power inverter configured to convert electrical power from one or more of the electrical generator and the one or more solar panels to grid-compatible electrical power.

13. The system of claim 12, further comprising one or more batteries configured to store energy produced by one or more of the electrical generator and the one or more solar panels.

14. The system of claim 12, further comprising the rooftop.

15. The system of claim 12, wherein the base spans multiple rooftop support beams.

16. The system of claim 12, wherein the one or more solar panels are electrically coupled to the electrical generator in series.

17. A method of power generation, the method comprising:
providing a wind turbine configured to drive an electrical generator;
electrically coupling one or more solar panels to the electrical generator to provide power from one or more of the electrical generator and the one or more solar panels; and
mounting a base for the wind turbine to a structure, the wind turbine pivotally coupled to the base such that an angle of the wind turbine is adjustable relative to the structure, wherein one or more connection arms extend laterally from the base; and
mechanically connecting the one or more solar panels to the one or more connection arms such that the one or more solar panels stabilize the wind turbine.

18. The method of claim 17, wherein the structure comprises a sloped rooftop, the method further comprising adjusting the angle of the wind turbine relative to the structure such that an axis of the wind turbine is vertical.

19. The method of claim 17, further comprising adjusting the angle of the wind turbine relative to the structure such that the wind turbine is folded down adjacent to the structure, in response to a prediction of dangerous weather conditions.

* * * * *